(12) United States Patent
Li et al.

(10) Patent No.: US 9,217,686 B2
(45) Date of Patent: Dec. 22, 2015

(54) MONITORING STATE OF FLUID TRANSPORT PIPE

(71) Applicant: International Business Machines Corporation, Armonk, NY (US)

(72) Inventors: Yan Li, Beijing (CN); Haibo Lin, Beijing (CN); Yudong Yang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 13/629,667

(22) Filed: Sep. 28, 2012

(65) Prior Publication Data

US 2013/0081449 A1    Apr. 4, 2013

(30) Foreign Application Priority Data

Sep. 30, 2011    (CN) .......................... 2011 1 0305400

(51) Int. Cl.
*G01M 3/28* (2006.01)
*G01M 3/00* (2006.01)
(Continued)

(52) U.S. Cl.
CPC ............ *G01M 3/2815* (2013.01); *G01M 3/005* (2013.01); *G01M 3/2823* (2013.01); *B08B 9/0552* (2013.01); *B08B 9/0553* (2013.01); *F16L 2101/30* (2013.01)

(58) Field of Classification Search
CPC . B08B 9/0553; B08B 9/0552; F16L 2101/30; G01M 3/005; G01M 3/2823; G01M 3/2815
USPC ......... 73/40, 40.5 R, 49.1; 15/104.061; 134/8
See application file for complete search history.

(56) References Cited

U.S. PATENT DOCUMENTS

| 6,070,942 | A  | * | 6/2000  | Barton et al. ............ 297/452.41 |
| 6,772,705 | B2 | * | 8/2004  | Leonard et al. ............... 114/333 |
| 7,278,293 | B2 | * | 10/2007 | Sierra et al. .................. 73/53.01 |

(Continued)

FOREIGN PATENT DOCUMENTS

| CN | 101115950 A | 1/2008 |
| EP | 1137921 B1 | 2/2003 |

(Continued)

OTHER PUBLICATIONS

Na, Seung Ya et al., Pipelines Monitoring System Using Bio-mimetic Robots, International Journal of Computer and Information Engineering, 2009, pp. 23-29, vol. 3:1.

(Continued)

*Primary Examiner* — Hezron E Williams
*Assistant Examiner* — David Z Huang
(74) *Attorney, Agent, or Firm* — Isaac J. Gooshaw (57) ABSTRACT

A method, apparatus, and system for monitoring the state of a fluid transport pipe. In one embodiment, there is provided a method of monitoring the state of a fluid transport pipe, the method including: causing a monitor to move along with a fluid inside the fluid transport pipe, the monitor including an elastic gas container and being configured to adjust the volume of the elastic gas container based on ambient pressure of the elastic gas container; and measuring and recording, by the monitor, one or more types of environmental data inside the fluid transport pipe for determining the state of the fluid transport pipe. In other embodiments, there are further provided an apparatus and system for monitoring a state of a fluid transport pipe.

20 Claims, 7 Drawing Sheets

(51) Int. Cl.
   *B08B 9/055*      (2006.01)
   *F16L 101/30*     (2006.01)

(56) References Cited

U.S. PATENT DOCUMENTS

| | | |
|---|---|---|
| 7,526,944 B2 | 5/2009 | Sabata et al. |
| 8,098,063 B2 | 1/2012 | Paulson |
| 2004/0182154 A1* | 9/2004 | Ghosh et al. .......... 73/448 |
| 2010/0312502 A1 | 12/2010 | Alonso |

FOREIGN PATENT DOCUMENTS

| | | |
|---|---|---|
| GB | 2295876 A | 6/1996 |
| GB | 2450621 A | 12/2008 |
| GB | 2474964 A | 5/2011 |
| GB | 2495169 B | 8/2013 |
| JP | 57187634 A | 11/1982 |
| JP | 2000258283 A | 9/2000 |
| WO | 9963317 A1 | 12/1999 |
| WO | 0170422 A1 | 9/2001 |
| WO | 2012010474 A1 | 1/2012 |

OTHER PUBLICATIONS

Kim, Jong-Hoon, SPAMMS: A Sensor-based Pipeline Autonomous Monitoring and Maintenance System, COMSNETS'10 Proceedings, 2010, pp. 118-127.

Jawhar, Imad et al., A Framework for Pipeline Infrastructure Monitoring Using Wireless Sensor Networks, Wireless Telecommunications Symposium, 2007, pp. 1-7.

Sun, Zhi et al., MISE-PIPE: Magnetic induction-based wireless sensor networks for underground pipeline monitoring, Ad Hoc Networks, 2011, pp. 218-227, vol. 9:3.

Lai, Tsung-Te et al., PipeProbe: A Mobile Sensor Droplet for Mapping Hidden Pipeline, SenSys '10, 2010, pp. 113-126.

Intellectual Property Office, Application No. GB1211367.6, Search Report, Oct. 19, 2012.

* cited by examiner

Fig. 1

(Prior Art)

MONITORING STATE OF FLUID TRANSPORT PIPE

CROSS REFERENCE TO RELATED APPLICATION

This application claims priority under 35 U.S.C. 119 from Chinese Application 201110305400.X, filed Sep. 30, 2011, the entire contents of which are incorporated herein by reference.

BACKGROUND OF THE INVENTION

1. Field of the Invention

Various embodiments of the present invention relate to monitoring of transport pipes, and more specifically, to a method, apparatus, and system for monitoring a state of a fluid transport pipe.

2. Description of the Related Art

With the development of industrial technologies, pipe transport technology has become more and more mature and has spread around the world. For example, pipes may be used to transport various fluids, such as water, oil, liquefied petroleum gas, etc. Compared with traditional transport modes in which transport is implemented using various means of transportation, pipe transport technology has advantages such as convenience, quickness, large transport volume and so on. However, transport pipes need daily maintenance, e.g., examining and repairing pipe leaks caused by pipe aging, natural disasters and the like. Besides natural damage, thefts or accidents might damage transport pipes.

In industrial applications, fluid transport pipes are typically laid in an area with relatively bad environmental conditions and have an extremely long span, usually on the order of thousands of kilometers. For a transport pipe of thousands of kilometers in length, timely fault discovery and repair can hardly be ensured based on the technical status quo. However, if faults cannot be discovered and repaired in time, then large-scale leaks might be caused, and then economic losses coupled with catastrophic consequences, such as environmental pollution, might follow.

BRIEF SUMMARY OF THE INVENTION

In order to overcome these deficiencies, the present invention provides a method of monitoring the state of a fluid transport pipe, including: causing a monitor including an elastic gas container to move along with a fluid inside the fluid transport pipe; adjusting a volume of the elastic gas container based on an ambient pressure of the elastic gas container; and measuring and recording, by the monitor, one or more types of environmental data inside the fluid transport pipe for determining a state of the fluid transport pipe.

According to another embodiment, the present invention provides a monitor for monitoring the state of a fluid transport pipe, including: a sensor for collecting at least one type of environmental data inside the fluid transport pipe; and an elastic gas container for containing gas, wherein a volume of the elastic gas container is adjustable.

According to yet another embodiment, the present invention provides a system for monitoring the state of an in-service fluid transport pipe, including: at least one monitor, including a sensor for collecting at least one type of environmental data inside the in-service fluid transport pipe; and an elastic gas container for containing gas, wherein a volume of the elastic gas container is adjustable; a reader for reading the at least one type of environmental data from the monitor located inside or outside the fluid transport pipe; and an evaluator for evaluating a state of the transport pipe based on the at least one type of environmental data.

BRIEF DESCRIPTION OF THE SEVERAL VIEWS OF THE DRAWINGS

Features, advantages, and other aspects of various embodiments of the present invention will become more apparent from the following detailed description, when taken in conjunction with the following figures, wherein several embodiments of the present invention are illustrated in an exemplary and non-limiting manner. Among the figures.

DETAILED DESCRIPTION OF THE PREFERRED EMBODIMENTS

Various embodiments of the present invention will be described below with reference to the figures. The flowchart and block diagrams in the figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference will be made to several exemplary embodiments for describing the principles and spirit of the present invention. It should be understood that these embodiments are presented only for enabling those skilled in the art to better understand and further implement the present invention, rather than limiting the scope of the present invention in any manner.

Figure 1:
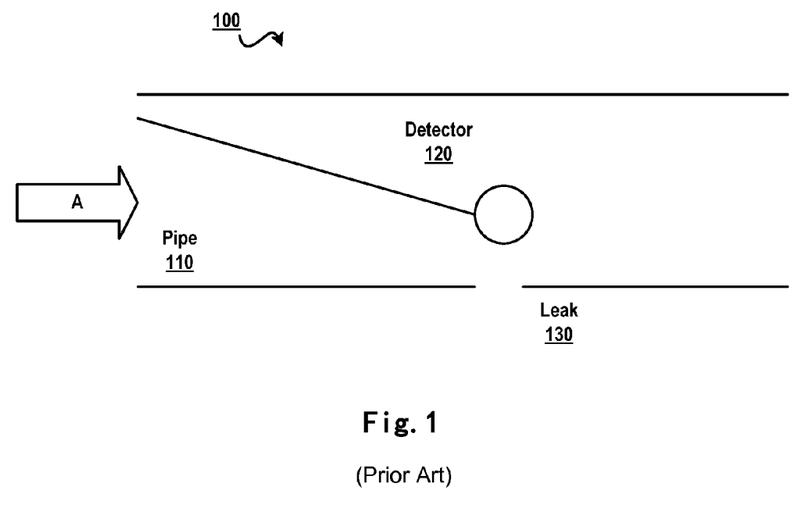
FIG. 1 is a schematic view illustrating a method of monitoring the state of an in-service fluid transport pipe according to a solution.

FIG. 1 is a schematic view 100 of a method of monitoring a state of an in-service fluid transport pipe according to a solution. As illustrated in FIG. 1, a pipe 110 is filled with a fluid, and the fluid flows in a direction shown by arrow A. In this solution, a rope traction detector 120 is adopted, and the detector 120 is disposed in the pipe and moves inside the pipe under the traction of ropes. The detector 120 can collect and record environmental data (e.g., pressure) inside the pipe in real time.

It should be noted that when the fluid pipe is in a sound state without the occurrence of such phenomena as a leak, pressure of the fluid inside the pipe must remain stable, e.g., remaining within a range of thresholds. When the pipe has a leak, the pressure inside the fluid near the leak will drop suddenly. For example, when the detector 120 is located near a leak 130 under traction of ropes, the detector 120 records pressure inside the fluid. According to the solution illustrated in FIG. 1, after the detector 120 is pulled out of the pipe 110 by ropes, data obtained by the detector 120 need to be analyzed in order to judge whether a leak occurs inside the pipe 110.

Present fluid transport pipes usually run thousands of kilometers long, and even the part between transit stations run dozens of kilometers long. Limited by the length of ropes, methods that use a rope traction detector can hardly be applied in monitoring states of long-distance transport pipes. In addition, since fluid transport pipes are usually laid according to terrain, they undergo ups and downs and perhaps have corners inside that are adverse to the deployment of ropes. Therefore, ropes are likely to twine inside pipes; moreover, the detector 120 is apt to collide with internal walls of the fluid transport pipe and thus cause damage.

To overcome drawbacks in the prior art, one embodiment of the present invention provides a method of monitoring a state of a fluid transport pipe. A principle of the method is to dispose a monitor inside a fluid transport pipe and cause it to move along with a fluid, so as to measure and record, in real time, one or more types of environmental data inside the fluid transport pipe and thus determine a state of the fluid transport pipe. Another principle of the method is to provide a mechanism to ensure that the monitor is suspending inside the fluid transport pipe, so as to reduce the probability of collision with internal walls of the fluid transport pipe during the movement along with the fluid.

Figure 2:
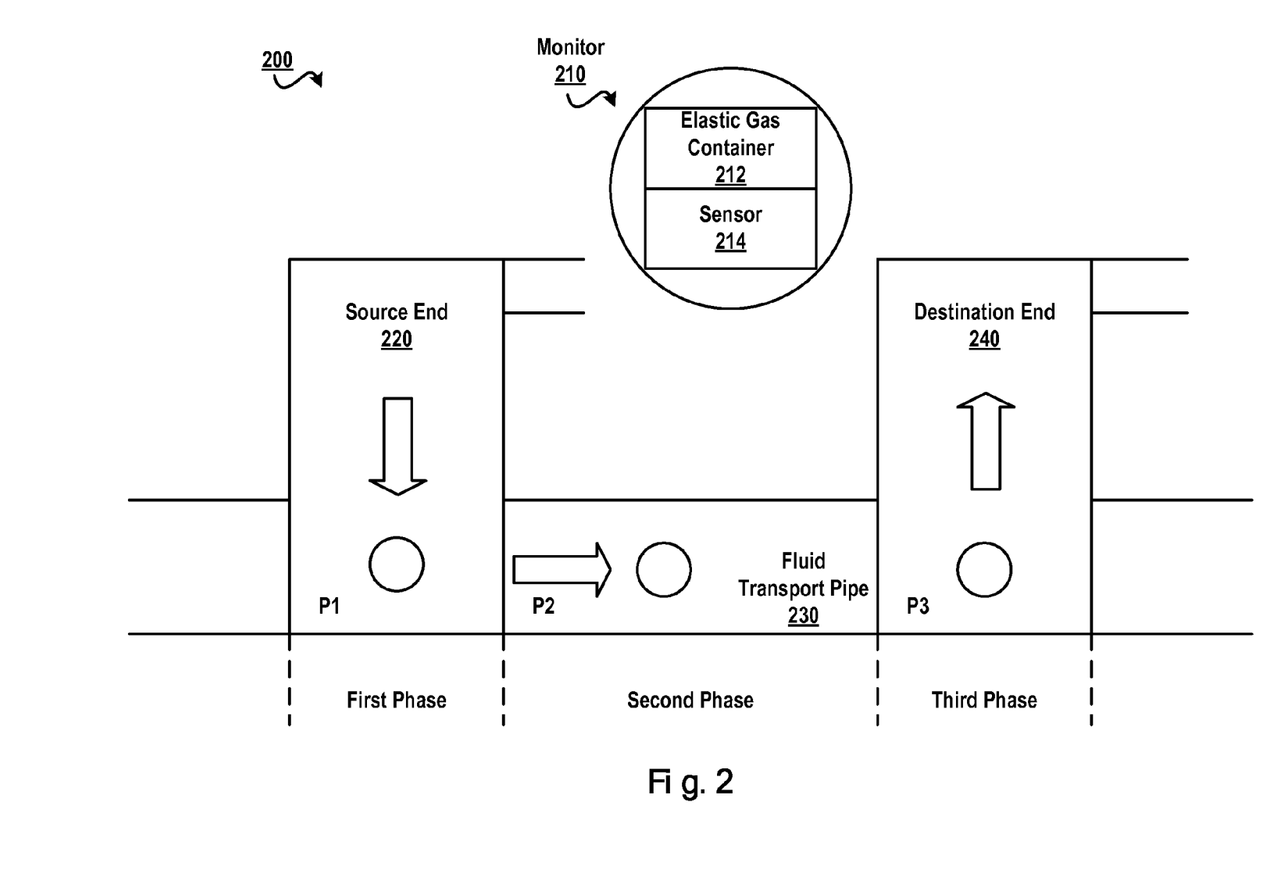
FIG. 2 is a schematic view illustrating a method of monitoring the state of an in-service transport pipe according to one embodiment of the present invention.

FIG. 2 illustrates a schematic view 200 of a method of monitoring a state of an in-service transport pipe. According to one embodiment of the present invention, a monitor 210 is disposed at a source end 220 of a fluid transport pipe 230 and is recycled at a destination end 240 of the fluid transport pipe 230. In order to increase accuracy, a plurality of monitors can be disposed, and various items of environmental data are calculated using a statistical method.

In one embodiment, the monitor 210 may include: a sensor 214 for collecting one or more types of environmental data inside the fluid transport pipe; and an elastic gas container 212 for containing gas, wherein a volume of the elastic gas container is adjustable. The elastic gas container 212 is, for example, a rubber airbag filled with air. When ambient pressure increases, gas inside the airbag contracts so that the volume of the airbag decreases; when ambient pressure decreases, gas inside the airbag expands so that the volume of the airbag increases. In case that density of the fluid keeps unchanged (or a change is so tiny that can be neglected), the buoyancy of the monitor 210 inside the fluid is directly proportional to the volume of the monitor 210 times density of the fluid. Hence, by changing pressure at the source end 220 and destination end 240 of the fluid transport pipe 230, the volume of the elastic gas container 212 can be changed and further the buoyancy of the monitor 210 changed, whereby the monitor 210 is controlled to sink, suspend or rise in the fluid.

In the first phase as illustrated in FIG. 2, pressure P1 at the source end 220 of the fluid transport pipe 230 is increased so that the monitor 210 can enter the fluid transport pipe along with the fluid. Since the volume of the elastic gas container 212 of the monitor 210 is adjustable, when ambient pressure increases and the volume of the elastic gas container 212 shrinks, the buoyancy of the monitor 210 inside the fluid decreases, and further the monitor 210 sinks inside the fluid.

One of objects of the present invention is that when the monitor 210 is inside the fluid transport pipe, the monitor 210 keeps suspending in the fluid so as to reduce collision with the fluid transport pipe 230. In the second phase, accordingly, inside the fluid transport pipe 230, when pressure decreases to pressure P2, the volume of the elastic gas container 212 enlarges due to decrease of pressure, and then buoyancy increases. In case that density of the fluid is unchanged, the monitor 210 can change to a suspending state from a sinking state in the previous phase. It should be noted that density of the fluid should be taken into consideration while designing mass and volume of the monitor 210.

In the third phase as illustrated in FIG. 2, pressure at the destination of the fluid transport pipe 230 decreases so that the monitor 210 including the elastic gas container 212 may rise from the fluid transport pipe 230.

In one embodiment of the present invention, there is provided a method of monitoring a state of a fluid transport pipe, the method including: causing a monitor to move along with a fluid inside the fluid transport pipe, wherein the monitor includes an elastic gas container, and the monitor is configured to adjust a volume of the elastic gas container based on ambient pressure of the elastic gas container; and measuring and recording, by the monitor, one or more types of environmental data inside the fluid transport pipe for determining the state of the fluid transport pipe.

It should be noted that since the elastic gas container is part of the monitor and occupies the majority of the monitor, it is not intended to distinguish between volumes of the elastic gas container and the monitor. Unless specified otherwise, volumes of the elastic gas container and the monitor can be used interchangeably.

Figure 3:
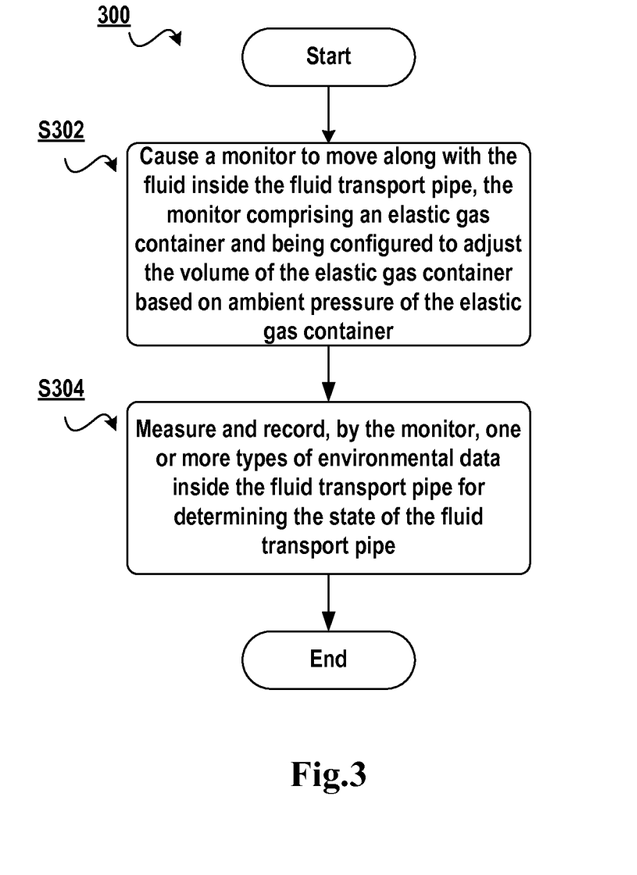
FIG. 3 is a flowchart illustrating a method of monitoring the state of an in-service transport pipe according to one embodiment of the present invention.

Now referring to FIG. 3, detailed description is given to steps of the present invention. FIG. 3 illustrates a flowchart 300 of a method of monitoring a state of an in-service transport pipe according to one embodiment of the present invention. In step S302, a monitor is caused to move along with a fluid inside the fluid transport pipe, wherein the monitor includes an elastic gas container, and the monitor is configured to adjust a volume of the elastic gas container based on ambient pressure of the elastic gas container. A purpose of adjusting a volume of the elastic gas container is to cause the monitor to move along with the fluid inside the fluid transport pipe and not to contact internal walls of the fluid transport pipe as much as possible for avoiding damage.

In step S304, the monitor measures and records one or more types of environmental data inside the fluid transport pipe for determining the state of the fluid transport pipe. The ultimate purpose of measuring environmental parameters is to determine whether an abnormality such as a leak has occurred inside the transport pipe, based on the environmental parameters. For example, when it is found that fluid pressure at a certain location decreases suddenly, a leak might have occurred at this location.

It should be noted that environmental parameters detected by the monitor are related to a location of the monitor in the transport pipe. For example, by recording the time when the monitoring starts and the speed at which the monitor moves inside the fluid transport pipe, the location of the monitor can be determined so that upon detection of an abnormality, the location where the abnormality has occurred can be quickly located. Of course, those skilled in the art may adopt other means of locating the abnormality.

According to one embodiment of the present invention, the method further includes: at a source end of the fluid transport pipe, in response to ambient pressure rising to a first range of pressure, the monitor reducing the volume to a first range of volume so as to sink in the fluid; inside the fluid transport pipe, in response to the ambient pressure being within a second range of pressure, the monitor maintaining the volume within a second range of volume so as to suspend in the fluid; and at a destination end of the fluid transport pipe, in response to the ambient pressure falling to a third range of pressure, the monitor expanding the volume to a third range of volume so as to rise in the fluid.

Figure 4:
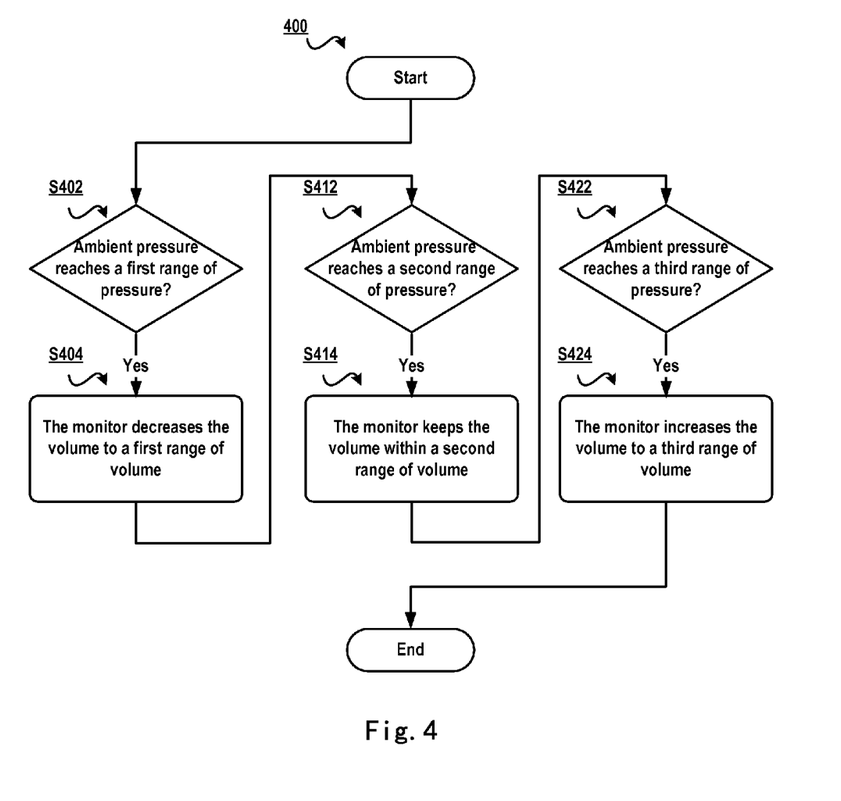
FIG. 4 is a flowchart illustrating how the volume of the elastic gas container of a monitor is adjusted based on ambient pressure according to one embodiment of the present invention.

Referring now to FIG. 4, detailed description is given to concrete implementation of adjusting the volume of the elastic gas container according to a method of the present invention. FIG. 4 is a flowchart 400 illustrating how an elastic gas container of the monitor adjusts the volume based on ambient pressure of the elastic gas container according to an embodiment of the present invention.

Operation performed at the source end of the fluid transport pipe is illustrated in steps S402-S404. When the monitor is at the source end of the fluid transport pipe, first it is detected in step S402 whether or not ambient pressure reaches the first range of pressure. If yes, the operation proceeds to step S404, at which point the monitor reduces the volume to the first range of volume so as to sink. As described above, since an elastic gas container is adopted in embodiments of the present invention, when the container's ambient pressure increases, the volume of the container is shrunk. In step S402, pressure at the source end is increased, so that the monitor including the elastic gas container sinks to be pressed into the transport pipe. It should be noted that values within the "first range of pressure" are higher than pressure inside the fluid transport pipe in normal conditions.

Operation performed inside the fluid transport pipe is illustrated in steps S412-S414. After the monitor enters into the fluid transport pipe, the ambient pressure decreases. At this moment, it is detected in step S412 whether or not the ambient pressure reaches the second range of pressure. If yes, the operation proceeds to step S414, at which point the monitor maintains the volume within the second range of volume so as to suspend in the fluid. At this moment, values within the second range of pressure are lower than values within the first range of pressure. In steps S412-S414, when the monitor detects that the ambient pressure decreases and enters the second range of pressure, the volume of the elastic gas container enlarges. At this moment, since the buoyancy of the monitor increases, the monitor is changed to the suspending state from the sinking state illustrated in steps S402-S404. It should be noted that since gravity and buoyancy of the monitor are substantially equal, the monitor can keep suspending itself in the fluid. Values within the second range of pressure are related to the pressure inside the fluid transport pipe in normal conditions, so it can be deemed that the second range of pressure is a range of pressure inside the fluid transport pipe in normal conditions.

Operation performed at the destination end of the fluid transport pipe is illustrated in steps S422-S424. When the monitor reaches the vicinity of the destination end of the fluid transport pipe, pressure can be reduced so as to recycle the monitor. At this moment, it is detected in step S422 whether or not pressure reaches the third range of pressure. If yes, the operation proceeds to step S424, at which point the monitor expands the volume to the third range of volume so as to rise. At this moment, values within the third range of pressure are less than values within the second range of pressure. In steps S422-S424, when the monitor detects that the ambient pressure decreases and enters the third range of pressure, the volume of the elastic gas container enlarges. At this moment, since the buoyancy of the monitor increases, the monitor is changed to the rising state from the suspending state illustrated in steps S412-S414.

In one embodiment of the present invention, the first, second, and third ranges of volume are determined based on the mass of the monitor and a variation range of density of the fluid. It should be noted that since the buoyancy of the monitor in the sinking state, the suspending state, and the rising state increases in this order, values in the first range of volume (corresponding to the sinking state)<values in the second range of volume (corresponding to the suspending state)<values in the third range of volume (corresponding to the rising state), and values in the first range of pressure (corresponding to the sinking state)>values in the second range of pressure (corresponding to the suspending state)>values in the third range of pressure (corresponding to the rising state).

In one embodiment of the present invention, the monitor may include an elastic gas container and a sensor, wherein the sensor can be attached to the surface of the elastic gas container in various manners or coupled to the elastic gas container in other manners. The volume of the elastic gas container is adjusted in response to variations of ambient pressure so that the monitor sinks, suspends or rises in the fluid.

In this embodiment, it is necessary to pre-set the mass of the monitor and the volume of the elastic gas container in the monitor according to density of the fluid inside the fluid transport pipe. For example, respective configurations of a monitor used for a water transport pipe differ from those of a monitor used for an oil transport pipe, so monitors have a poor universal property. Therefore, it is desired to provide a monitor that can be applied to various kinds of fluid transport pipes.

In one embodiment of the present invention, the monitor uses an adjustable support structure to adjust the volume. In addition to passively adjusting the volume of the elastic gas container based on ambient pressure, an advantage of using the adjustable support structure lies in providing an approach to actively adjusting the volume.

In one embodiment of the present invention, the method further includes: outputting one or more types of environmental data from the monitor inside or outside the fluid transport pipe. Those skilled in the art should understand that as mentioned above, the monitor can be recycled at the destination end of the fluid transport pipe. When the monitor is located outside the fluid transport pipe, one or more types of detected environmental data are read from the monitor; or when the monitor is transported along with the fluid inside the fluid transport pipe, one or more types of environmental data transmitted from the monitor inside the fluid transport pipe can be received wirelessly, so as to determine the state of the fluid transport pipe based on the one or more types of environmental data.

Figure 5A:
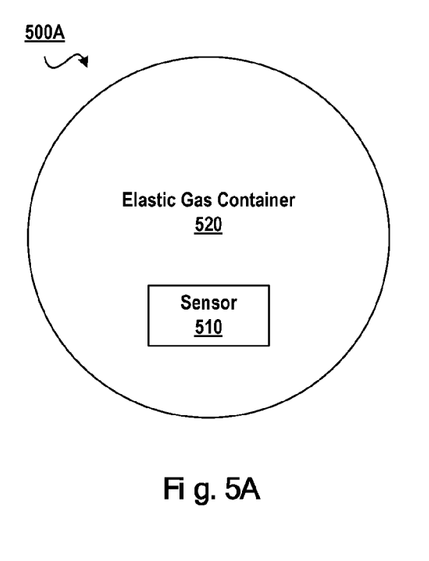
FIG. 5A is a block diagram illustrating an apparatus for monitoring the state of an in-service transport pipe according to an embodiment of the present invention.
Figure 5B:
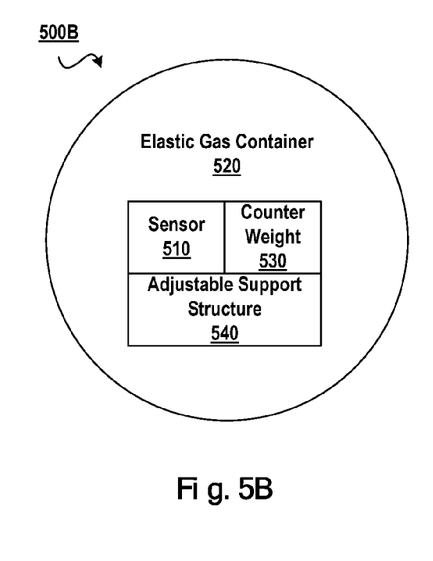
FIG. 5B is a block diagram illustrating an apparatus for monitoring the state of an in-service transport pipe according to an embodiment of the present invention.
Figure 5C:
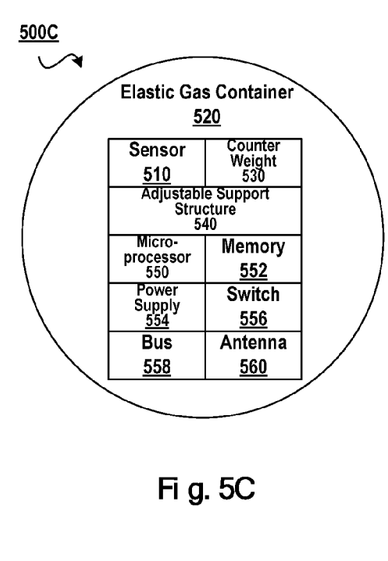
FIG. 5C is a block diagram illustrating an apparatus for monitoring the state of an in-service transport pipe according to an embodiment of the present invention.

In one embodiment of the present invention, there is provided a monitor for monitoring a state of a fluid transport pipe, the monitor including: a sensor for collecting one or more types of environmental data within the fluid transport pipe; and an elastic gas container for containing gas, wherein a volume of the elastic gas container is adjustable. Hereinafter, the monitor according to the present invention will be described with reference to FIGS. 5A-5C. FIGS. 5A, 5B, and 5C are block diagrams illustrating an apparatus for monitoring a state of an in-service transport pipe according to different embodiments of the present invention.

As illustrated in FIG. 5A, a monitor 500A includes a sensor 510 and an elastic gas container 520. It should be noted that the volume of the elastic gas container can be adjusted based on ambient pressure of the elastic gas container so as to cause the monitor to rise, sink or move along with the fluid inside the fluid transport pipe.

As illustrated in FIG. 5B, besides the sensor 510 and the elastic gas container 520, a monitor 500B can further include a counter weight 530 and an adjustable support structure 540. The counter weight 530 can adjust the mass of the monitor so as to cause the monitor to sink, suspend or rise in fluids of different density. In one embodiment, the mass of the counter weight is determined at least based on density of the fluid within the fluid transport pipe. For example, since the density of water is greater than the density of oil, a larger counter weight can be selected for a monitor used for a water transport pipe, and a smaller counter weight can be selected for a monitor used for an oil transport pipe.

In one embodiment, the monitor further includes: an adjustable support structure for adjusting the volume of the elastic gas container; and a microprocessor for controlling the adjustable support structure based on ambient pressure of the elastic gas container.

In one embodiment, the adjustable support structure 540 is configured to adjust the volume of the elastic gas container, and the adjustable support structure 540 further includes a motor for driving the adjustable support structure.

In one embodiment of a monitor 500C as illustrated in FIG. 5C, a microprocessor 550 can be further included for controlling the adjustable support structure 540 to adjust the volume of the elastic gas container 520 based on the ambient pressure of the elastic gas container. The monitor 500C can further include: a memory 552 for storing environmental data. In one embodiment of the present invention, the monitor can further include a wireless transmitter (antenna) 560 for sending one or more types of environmental data. The purpose of storing environmental data is that environmental data stored in the memory can be read after the monitor is recycled. And the wireless transmitter is arranged for the purpose of wirelessly transmitting detected environmental data outwards while the monitor is in the fluid transport pipe.

In one embodiment of the present invention, a power supply 554, a switch 556, and a bus 558 can be further included. It should be noted that FIGS. 5A-5C merely schematically illustrate monitors according to various embodiments of the present invention, and respective elements in the figures are only for the purpose of illustration and not drawn to scale.

Figure 6A:
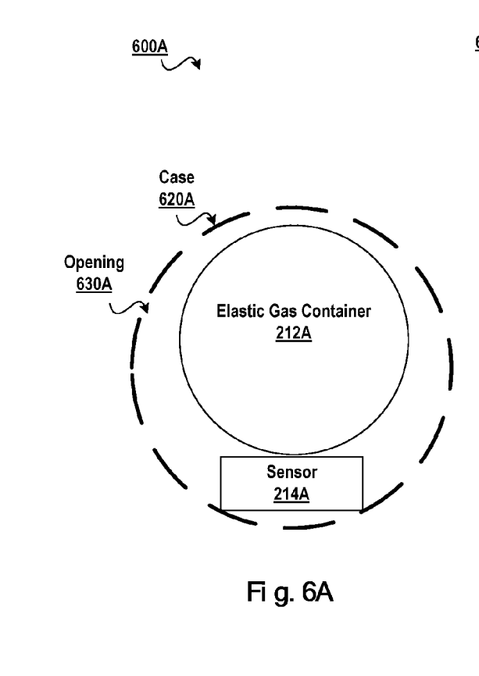
FIG. 6A is a schematic view illustrating an adjustable support structure according to an embodiment of the present invention.

Hereinafter, the adjustable support structure according to embodiments of the present invention will be described in detail with reference to FIGS. 6A-6C. As illustrated in FIG. 6A, a monitor 600A can further include a case 620A for containing the sensor 214A and the elastic gas container 212A. The case 620A can have an opening 630A such that a probe of the sensor is in contact with the fluid while the case contains and protects the sensor 214A and the elastic gas container 212A. In one embodiment of the present invention, the case 620A is made of any one of the following materials: plastics, stainless steel, and aluminum alloy. To prevent the case 620A from shielding wireless signals, the case can be made of plastics. In FIG. 6A, the elastic gas container 212A itself functions to adjust the volume of the monitor 600A.

Figure 6B:
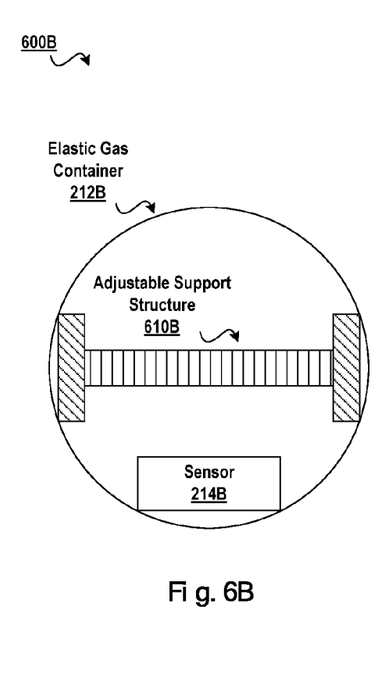
FIG. 6B is a schematic view illustrating an adjustable support structure according to an embodiment of the present invention.

In a monitor 600B as illustrated in FIG. 6B, a sensor 214B and an adjustable support structure 610B can be arranged inside the elastic gas container 212B. For example, the adjustable support structure 610B may "stretch" elastic outer walls of the elastic gas container 212B leftwards and rightwards. Although FIG. 6B illustrates an adjustable support structure 610B moving leftwards or rightwards, one or more adjustable support structures 610B may stretch far away from the center of the elastic gas container in other directions so as to increase the volume of the elastic gas container 212B; or they shrink towards the center of the elastic gas container 212B so as to decrease the volume of the elastic gas container 212B.

Figure 6C:
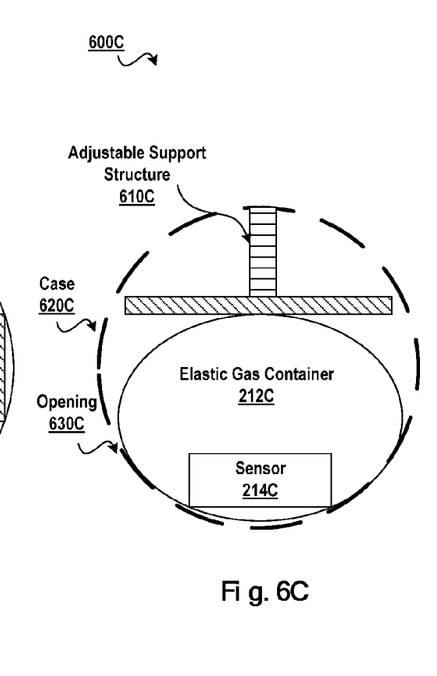
FIG. 6C is a schematic view illustrating an adjustable support structure according to an embodiment of the present invention.

In a monitor 600C as illustrated in FIG. 6C, an adjustable support structure 610C can be arranged outside the elastic gas container 212C. For example, the adjustable support structure 610C can be coupled to a case 620C and squeeze the elastic gas container 212C towards the center of the case 620C so as to shrink the volume of the elastic gas container 212C; or the adjustable support structure 610C can shrink far away from the center of the case 620C so as to increase the volume of the elastic gas container 212C. Although FIG. 6C illustrates an adjustable support structure 610C moving in one direction, one or more adjustable support structures 610C can be arranged in other directions so as to squeeze or release the elastic gas container 212C in various directions.

Figure 7:
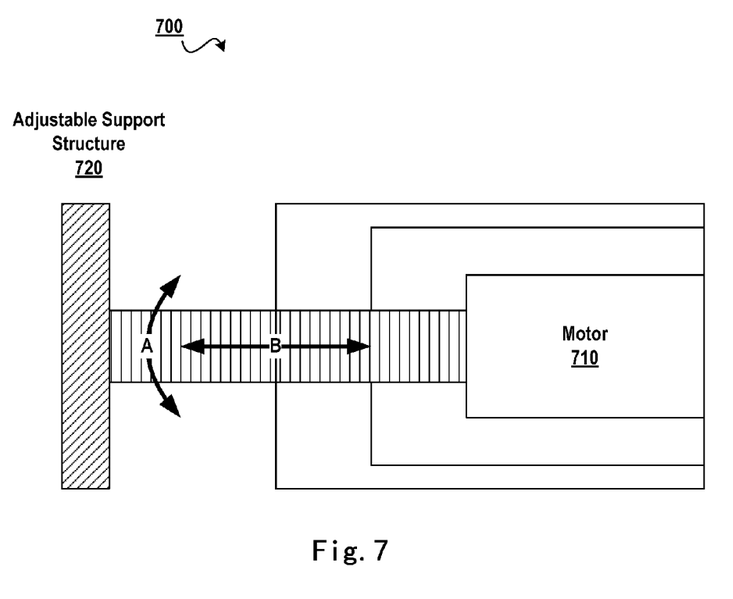
FIG. 7 is a schematic view illustrating operating principles of an adjustable support structure according to one embodiment of the present invention.

FIG. 7 is a schematic view 700 illustrating operating principles of an adjustable support structure according to one embodiment of the present invention. An adjustable support structure 720 is coupled to a motor 710 and driven by the motor 710, it may rotate bi-directionally along arrow A. As a result, the adjustable support structure 720 will move directionally along arrow B in the horizontal direction, i.e., being expanded or contracted. In conjunction with the embodiments as illustrated in FIGS. 6B and 6C, the adjustable support structure 720 can achieve the effect of "expansion and contraction" and further change the volume of the elastic gas container so as to control the monitor to sink, suspend and rise in the fluid.

In one embodiment of the present invention, the elastic gas container is made of silicon rubber.

In one embodiment of the present invention, the gas in the elastic gas container is at least one of one of air, nitrogen, and inert gas.

In one embodiment of the present invention, the sensor includes at least one of a pressure sensor, a speed sensor, a temperature sensor, a humidity sensor, a gyroscope, and a magnetic flux leakage detection sensor. It should be noted that when a different sensor is used, the criterion for judging whether a fault occurs also differs. For example, a sudden change in pressure, speed, temperature, or humidity might indicate the occurrence of a leak.

In one embodiment of the present invention, there is provided a system for monitoring a state of an in-service fluid transport pipe, wherein the system includes: at least one monitor including a sensor for collecting one or more types of environmental data inside the fluid transport pipe, and an elastic gas container for containing gas, wherein a volume of the elastic gas container is adjustable; a reader for reading one or more types of environmental data from the monitor located inside or outside the fluid transport pipe; and an evaluator for evaluating the state of the fluid transport pipe based on the one or more types of environmental data.

In one embodiment of the present invention, the volume of the elastic gas container is adjusted based on ambient pressure of the elastic gas container, such that the monitor moves along with a fluid inside the fluid transport pipe.

In one embodiment of the present invention, the monitor further includes: an adjustable support structure for adjusting the volume of the elastic gas container; and a microprocessor for controlling the adjustable support structure based on the ambient pressure of the elastic gas container.

In one embodiment of the present invention, the adjustable support structure further includes a motor for driving the adjustable support structure.

In one embodiment of the present invention, the monitor further includes: a counter weight for adjusting the mass of the monitor, wherein the mass of the counter weight is determined at least based on the density of the fluid inside the fluid transport pipe.

In one embodiment of the present invention, the monitor further includes: a memory for storing the one or more types of environmental data.

In one embodiment of the present invention, the monitor further includes: a wireless transmitter for transmitting the one or more types of environmental data.

In one embodiment of the present invention, the elastic gas container is made of silicon rubber.

In one embodiment of the present invention, the gas inside the elastic gas container is at least one of air, nitrogen, and inert gas.

In one embodiment of the present invention, the sensor includes at least one of a pressure sensor, a speed sensor, a temperature sensor, a humidity sensor, a gyroscope, and a magnetic flux leakage detection sensor.

Taking an oil transport pipe as an example, description is given below to how to implement the method, apparatus, and system according to the present invention. For example, the diameter of the oil transport pipe is about 1 meter (e.g., 1219 mms), fluid pressure inside the pipe is 150 MPa, and fluid density is 800 kg/m$^3$.

In one embodiment of the present invention, the gas inside the elastic gas container can be air, nitrogen or inert gas, and an elastic, scalable, temperature-insensitive, and corrosion-insusceptible material can be selected for making the airbag so as to form the elastic gas container. For example, nitrogen is sealed in the airbag made of silicon rubber and is shaped into a ball; a volume of the ball ranges between 15 and 50 cm$^3$, the mass of the gas can be neglected, and the mass of the silicon rubber airbag is about 3 g.

Various types of sensors can be selected depending on measurement requirements, and the monitor can include at least one sensor. A probe of the sensor may protrude from an opening of a case of the sensor. For example, a temperature sensor can be selected with a mass of 0.168 g and a volume of 1.95×5.08×3.1 mm; a dead weight of a button battery is 0.6 g and a volume thereof is 25 mm$^3$. Hence, a total mass of the entire monitor is about 1 g, and a volume thereof is about 20×6×3.5 mm that equals 420 mm$^3$.

The case is a rigid container having several openings thereon and is made of a material that can be stainless steel; the number of openings is more than 4 and less than 20 with a diameter of 1-3 mm. Hence, a total mass of the case is 10 g and a volume thereof is about 40 cm$^3$.

A counter weight is made of a corrosion-insusceptible metal material, such as lead metal. For example, a lead block of 2 g is selected whose volume can be neglected.

In one embodiment of the present invention, the monitor may have 4 states: a storage state indicating that the monitor has been manufactured but has not yet come into service; and 3 deployment states where the monitor is deployed to the fluid transport pipe, e.g., a state in which the monitor reduces its volume to the first range of volume by increasing pressure at the source end of the fluid transport pipe so that the monitor sinks; a transport state that indicates that the monitor has entered the fluid transport pipe, suspends in the fluid and moves along with the fluid; and a recycle state that indicates that the monitor increases its volume to the third range of volume by decreasing pressure at the destination end of the fluid transport pipe so that the monitor rises. The mass of the monitor is 16 g and keeps unchanged in the entire period of monitoring. Related parameters in each state are as follows:

1. Storage State: a total volume is 40 cm$^3$, density of the entire monitor is 400 kg/m$^3$, and ambient air pressure is about 133.32 Pa in the storage state.

2. Deployment State: after the monitor is launched, at the source end of the fluid transport pipe, pressure is increased to 160 MPa, at which point the volume of the elastic gas container reduces to 18.75 cm$^3$ and density of the monitor changes to 853 kg/m$^3$ since the mass of the monitor is not changed. The density is now more than the 800 kg/m$^3$ that is the density of the fluid inside the fluid transport pipe, so the monitor sinks into the fluid transport pipe.

3. Transport State: pressure inside the fluid transport pipe is 150 MPa, and the volume of the elastic gas container is 20 cm$^3$, at which point density of the monitor changes to 800 kg/m$^3$ since the mass of the monitor is not changed. The density is now equal to the 800 kg/m$^3$ that is density of the fluid inside the fluid transport pipe, so the monitor is in the suspending state.

4. Recycle State: pressure at the destination end of the fluid transport pipe is 100 MPa, and the volume of the elastic gas container is 30 cm$^3$, at which point density of the monitor changes to 533 kg/m$^3$ since the mass of the monitor is not changed. The density is now less than the 800 kg/m$^3$ that is the density of the fluid inside the fluid transport pipe, so the monitor is in the rising state.

It should be noted that the first, the second, and the third range of pressure as mentioned in embodiments of the present invention are pressures causing the monitor to sink, suspend, and rise in the fluid, respectively; when ambient pressure reaches any of the three ranges, the elastic gas container accordingly changes to the volume in the first, the second, or the third range of volume respectively. For the above-mentioned oil transport pipe, the density of oil is 800 kg/m3; examples of ranges of pressure and ranges of volume are respectively as shown in Table 1 and Table 2.

TABLE 1

| Ranges of Pressure | |
|---|---|
| Name | Range |
| first pressure | 152-180 MPa |
| second pressure | 148-152 MPa |
| third pressure | 90-148 MPa |

TABLE 2

Ranges of Volume

| Name | Range |
|---|---|
| first volume | 15-19 cm$^3$ |
| second volume | 19-21 cm$^3$ |
| third volume | 21-40 cm$^3$ |

It should be noted that values in Table 1 and Table 2 are merely specific examples of thresholds of pressure and thresholds of volume. One of objects of the present invention is to enable the monitor to move along with the fluid inside the fluid transport pipe in a suspending manner; to ensure that the monitor keeps suspending in response to minor variations in pressure inside the fluid transport pipe, preferably, the first range of pressure can be 150.5-180 MPa, the second range of pressure can be 149.5-150.5 MPa, and the third range of pressure can be 90-149.5 MPa. A principle of selecting the second range of thresholds of pressure is to ensure that the buoyancy of the monitor approximates to the total gravity of the monitor when the monitor is in the second range of thresholds of pressure. It should be noted that the "approximate" mentioned here allows a difference between buoyancy and gravity. For example, when the difference is within ±0.5 g, it is deemed that the approximation relationship is established. To improve precision, a range of smaller allowed difference can be selected, e.g., ±0.3 g.

In addition, ranges of thresholds of volume can be related to the difficulty degree of compressing the elastic gas container or to staying within a secure range of volume of the elastic gas container. In different embodiments, thresholds of volume differ slightly, and an analysis should be made depending on concrete situations. However, a general principle, according to Archimedes, is that buoyancy equals to gravity. It should be noted that to protect the monitor from damage, the monitor should operate within a secure range of pressure, for example, pressure that is no more than 180 MPa. Meanwhile, the volume of the elastic gas container should operate within a secure range; for example, the largest volume is no more than 50 cm$^3$.

In one embodiment of the present invention, the adjustable support structure is responsible for supporting the rubber container, and a rotating screw is driven by the motor to push the support structure, so that the volume of the entire rubber ball is changed, thereby controlling the monitor's ability to sink, suspend and rise in the fluid. In one embodiment the mass of the adjustable support structure approximates to 7.4 g.

In one embodiment, a control unit is provided with a pressure sensor that can sense ambient pressure and calculate a volume corresponding to ambient pressure. The control unit sends instructions to control the motor and cause the support structure to move, so that the volume of the rubber ball is changed. In one embodiment, the mass of the control unit equals 0.5 g.

Embodiments of the present invention are not incompatible with existing magnetic flux leakage detection technology. If a core magnetic excitation portion and a probe portion in existing magnetic flux leakage detection technology are placed into the monitor of the present invention as sensors, then pipe defects can be detected using magnetic flux leakage technology.

With embodiments of the present invention, existing fluid transport pipes can be monitored conveniently, and flaws in transport pipes can be discovered rapidly at a low cost so, enabling a fast response to problems.

The present invention can be implemented in software, hardware or combination of software components and hardware components. In a preferred embodiment, part of the present invention is implemented as software, including, without limitation, firmware, resident software, micro-code, etc. The apparatus of the present invention can be implemented using, for example, an embedded system or a programmable logic circuit.

A data processing system adapted for storing and/or executing non-transient program code would include at least one processor that is coupled to a memory element directly or via a system bus. The memory element can include a local memory usable during actually executing the program code, a mass memory, and a cache that provides temporary storage for at least one portion of program code so as to decrease the number of times for retrieving code from the mass memory during execution.

It is to be understood from the foregoing description that modifications and alterations can be made to the respective embodiments of the present invention without departing from the real spirit of the present invention. The description in this specification is for purposes of illustration only, and should not be construed as limiting. The scope of the present invention is only defined by the appended claims.

What is claimed is:

1. A method of monitoring the state of a fluid transport pipe, comprising:
   causing a monitor comprising an elastic gas container to move along with a fluid inside said fluid transport pipe;
   adjusting a volume of said elastic gas container based, at least in part, on an ambient pressure of said elastic gas container, wherein the adjustment to the volume of said elastic gas container is made in response to said ambient pressure being within a range of pressure; and
   measuring and recording, by said monitor, one or more types of environmental data inside said fluid transport pipe for determining a state of said fluid transport pipe.

2. The method according to claim 1, further comprising:
   at a source end of said fluid transport pipe, in response to said ambient pressure increasing to a first range of pressure, said monitor decreasing said volume to a first range of volume whereby said monitor sinks in said fluid;
   inside said fluid transport pipe, in response to said ambient pressure being in a second range of pressure, said monitor keeping said volume within a second range of volume whereby said monitor suspends in said fluid; and
   at a destination end of said fluid transport pipe, in response to said ambient pressure decreasing to a third range of pressure, said monitor increasing said volume to a third range of volume whereby said monitor rises in said fluid.

3. The method according to claim 2, further comprising: determining said first, said second, and said third range of volume based on said mass of said monitor and a variation range of said density of said fluid.

4. The method according to claim 1, further comprising: using an adjustable support structure to adjust the volume of said elastic gas container.

5. The method according to claim 4, further comprising: outputting, by said monitor, the one or more types of environmental data.

6. A monitor for monitoring the state of a fluid transport pipe, comprising:
   a sensor for collecting at least one type of environmental data inside said fluid transport pipe; and
   an elastic gas container for containing gas, wherein a volume of said elastic gas container is adjustable based, at least in part, on an ambient pressure of said elastic gas container being within a range of pressure.

7. The monitor according to claim 6, wherein said volume of said elastic gas container is adjusted based on an ambient pressure of said elastic gas container to cause said monitor to perform one of: rise, sink, and move along with a fluid inside said fluid transport pipe.

8. The monitor according to claim 7, further comprising:
an adjustable support structure for adjusting said volume of said elastic gas container; and
a microprocessor for controlling said adjustable support structure based on ambient pressure of said elastic gas container.

9. The monitor according to claim 8, wherein said adjustable support structure further comprises a motor for driving said adjustable support structure.

10. The monitor according to claim 7, further comprising: a counter weight for adjusting a mass of said monitor, wherein said mass of said counter weight is determined at least based on a density of said fluid inside said fluid transport pipe.

11. The monitor according to claim 7, further comprising: a wireless transmitter for transmitting said at least one type of environmental data.

12. The monitor according to claim 7, wherein said elastic gas container is made of silicon rubber.

13. The monitor according to claim 7, wherein said gas inside said elastic gas container includes at least one of air, nitrogen, or inert gas.

14. The monitor according to claim 7, further comprising: a case for containing said sensor and said elastic gas container.

15. The monitor according to claim 7, wherein said sensor includes at least one of a pressure sensor, a speed sensor, a temperature sensor, a humidity sensor, a gyroscope, or a magnetic flux leakage detection sensor.

16. A system for monitoring the state of an in-service fluid transport pipe, comprising:
at least one monitor, comprising:
i) a sensor for collecting at least one type of environmental data inside said in-service fluid transport pipe; and
ii)al an elastic gas container for containing gas, wherein a volume of said elastic gas container is adjustable based, at least in part, on an ambient pressure of said elastic gas container being within a range of pressure;
a reader for reading said at least one type of environmental data from said monitor located inside or outside said fluid transport pipe; and
an evaluator for evaluating a state of said transport pipe based on said at least one type of environmental data.

17. The system according to claim 16, wherein said volume of said elastic gas container is adjusted based on an ambient pressure of said elastic gas container to cause said monitor to perform one of: rise, sink, and move along with a fluid inside said fluid transport pipe.

18. The system according to claim 17, wherein said monitor further comprises:
an adjustable support structure for adjusting said volume of said elastic gas container; and
a microprocessor for controlling said adjustable support structure based on ambient pressure of said elastic gas container.

19. The system according to claim 18, wherein said adjustable support structure further comprises a motor for driving said adjustable support structure.

20. The system according to claim 17, further comprising: a counter weight for adjusting a mass of said monitor, wherein said mass of said counter weight is determined at least based on a density of said fluid inside said fluid transport pipe.

* * * * *